United States Patent
Yamada et al.

(10) Patent No.: US 7,114,969 B2
(45) Date of Patent: Oct. 3, 2006

(54) STRUCTURE OF GLOVE BOX

(75) Inventors: Tomiharu Yamada, Tokyo (JP);
Toshiaki Sugisaki, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/078,363

(22) Filed: Mar. 14, 2005

(65) Prior Publication Data

US 2005/0215080 A1    Sep. 29, 2005

(51) Int. Cl.
*H01R 13/62* (2006.01)

(52) U.S. Cl. .................................................. 439/157
(58) Field of Classification Search ............... 439/157, 439/372, 364, 559, 557; 296/37.12
See application file for complete search history.

(56) References Cited

U.S. PATENT DOCUMENTS 6,811,417 B1 *   11/2004   Itoh et al. .................... 439/157

FOREIGN PATENT DOCUMENTS

JP          2004-254364 A      9/2004

* cited by examiner

*Primary Examiner*—Tulsidas C. Patel
*Assistant Examiner*—Phuongchi Nguyen
(74) *Attorney, Agent, or Firm*—Foley & Lardner LLP

(57) ABSTRACT

A structure of a glove box, including a glove box body having a rear wall extending near a dash-panel and a temporary connector holding part provided on an opposite portion of the rear wall opposing to a connector mounting opening provided in the dash-panel the temporary connector holding part having a temporary connector holding bracket provided on the opposite portion of the rear wall and the temporary connector holding bracket having a connector containing concave portion and a connector engaging portion.

4 Claims, 5 Drawing Sheets

STRUCTURE OF GLOVE BOX

CROSS-REFERENCE TO THE RELATED APPLICATION

The application claims the priority benefit of Japanese Patent Application No. 2004-88215, filed on Mar. 25, 2004, the entire descriptions of which are incorporated herein by reference.

BACKGROUND OF THE INVENTION

1. Field of the Invention

The present invention relates to an improvement in a structure of a glove box, which is provided in a vehicle.

2. Description of Related Art

Generally, a dash-panel parting an engine room and a vehicle interior in a vehicle body of a vehicle such as an automobile is provided on a front portion of the vehicle interior in the vehicle. A first connector connected with an end of a harness wired in the engine room and a second connector connected with an end of a harness wired in the vehicle interior are structured to be connected through a connector mounting opening provided in the dash-panel (for reference, see Japanese Patent Application No. 2003-39588).

In the connector connecting structure described in the patent document, a connection for the connecters is achieved as follows.

That is to say, it is possible to make efficiently a cockpit by preparing a cockpit module in which parts around the cockpit are pre-assembled and integrated, and mounting the cockpit module on the front portion of the vehicle interior at once and fixing it. At this time, the second connector connected with the end of the harness wired in the vehicle interior is temporarily held on the cockpit module so that the cockpit module is positioned in a position opposing to the connector mounting opening simultaneously with the mounting of the cockpit module on the vehicle body. Thereafter, the first connector connected with the end of the harness wired in the engine room is disposed in the vicinity of the connector mounting opening, and then the first connector is fitted temporarily in the second connector. Thereafter, the second connector is drawn by an operation of a drawing mechanism provided on the first connector. Consequently, the temporarily held state of the second connector by the cockpit module is released and fitted in the second connector so that the both harnesses are in an electrically conducted state.

Meanwhile, the cockpit module includes a glove box, an instrument panel and so on.

However, it is not disclosed by what method the second connector in the vehicle interior is temporarily held to the cockpit module including the glove box, in the connector connecting structure as described in the above-mentioned patent document. If the second connector is temporarily held on the instrument panel because it is not possible to adopt a structure for temporarily holding directly the second connector on the instrument panel, the other bracket must be mounted on the instrument panel and a temporary connector holding bracket must be further mounted on the other bracket. Accordingly, there is a problem that the increment in parts and mounting processes is generated by the addition of the brackets as described above, therefore cost and manufacturing efficiency in the connector connecting structure are improper.

Moreover, because the harnesses disposed between the engine room and the vehicle interior are thick and heavy, and the connectors become also large and heavy in order to allow the connectors to temporarily hold on the instrument panel a rigidity of the instrument panel must be increased correspondingly. This causes a structural problem in the connector connection structure.

SUMMARY OF THE INVENTION

The present invention has been made to resolve the above problems in the prior art and an object thereof is to provide a structure of a glove box capable of guiding and connecting two connectors easily.

To accomplish the above object, a structure of a glove box according to the present invention comprises a glove box body having a rear wall extending near a dash-panel and a temporary connector holding part provided on an opposite portion of the rear wall opposing to a connector mounting opening provided in the dash-panel.

In an embodiment, the temporary connector holding part includes a temporary connector holding bracket provided on the rear wall of the glove box body.

In another embodiment, a harness clamping part is further provided near the temporary connector holding part of the glove box body.

According to the present invention, a connector can be positioned to face the connector mounting opening of the dash-panel only by setting the glove box body. Moreover, the temporary connector holding bracket can be mounted directly and efficiently on the glove box body by provision of the temporary connector holding bracket. It is also possible to hold temporarily the connector inexpensively. Furthermore, a position of a harness near the connector can be supported and held efficiently by provision of the harness clamping part.

DETAILED DESCRIPTION OF THE PREFERRED EMBODIMENTS

Preferred embodiments of the present invention will be explained in detail with reference to the accompanying drawings below.

Figure 1:
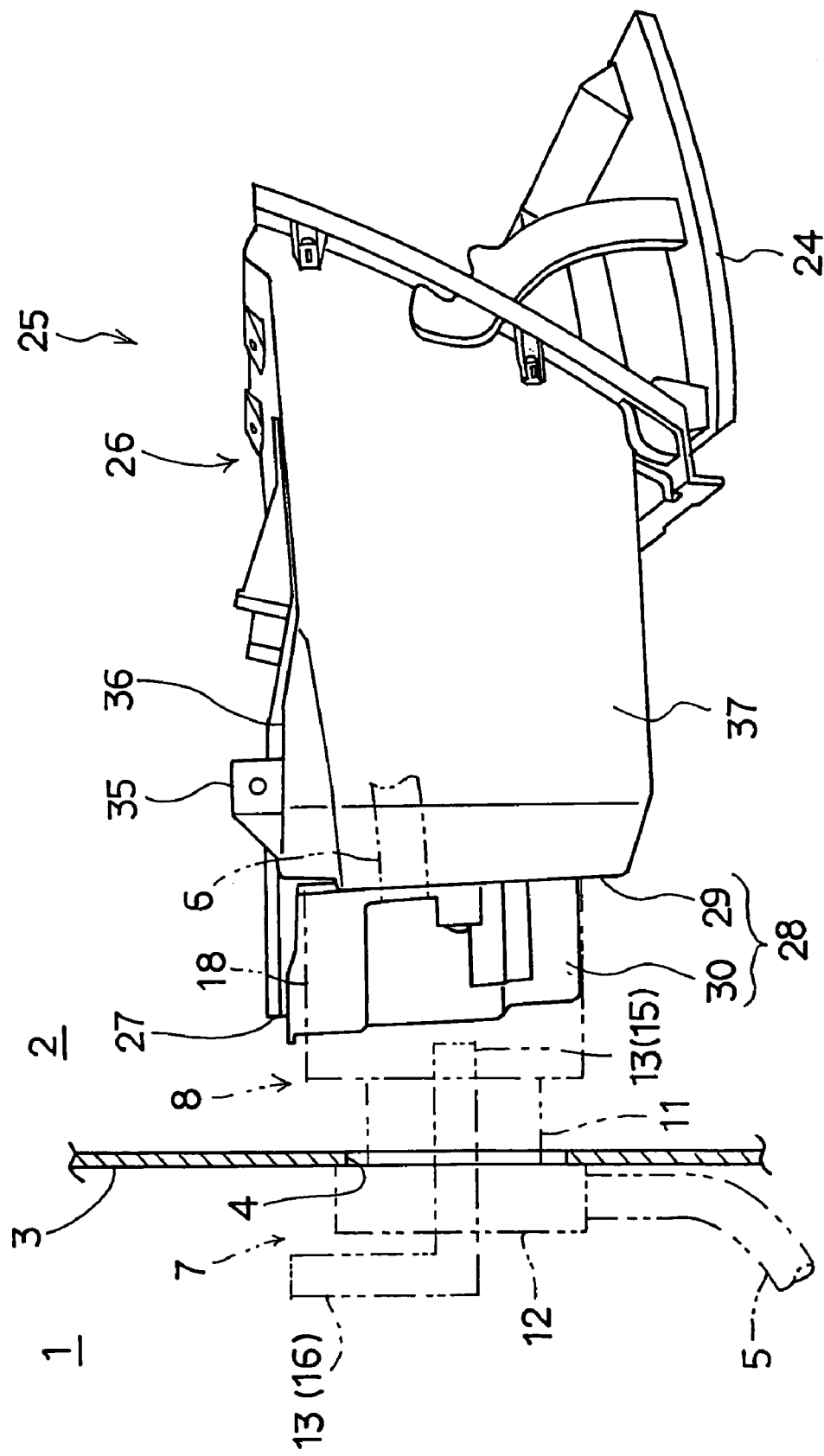
FIG. 1 is a partially sectioned side view showing an embodiment of a structure for a glove box according to the present invention, together with a connector connecting structure.

As shown in FIG. 1, a parting wall such as a dash-panel 3 separating an engine room 1 and a vehicle interior 2 is provided on a front portion of the vehicle interior in a vehicle such as an automobile. A connector mounting opening 4 is provided in the dash-panel 3. A first connector 7 connected with an end of a harness 5 wired in the engine room 1 and a second connector 8 connected with an end of a harness 6 wired in the vehicle interior 2 are structured to be connected through the connector mounting opening 4.

Figure 2:
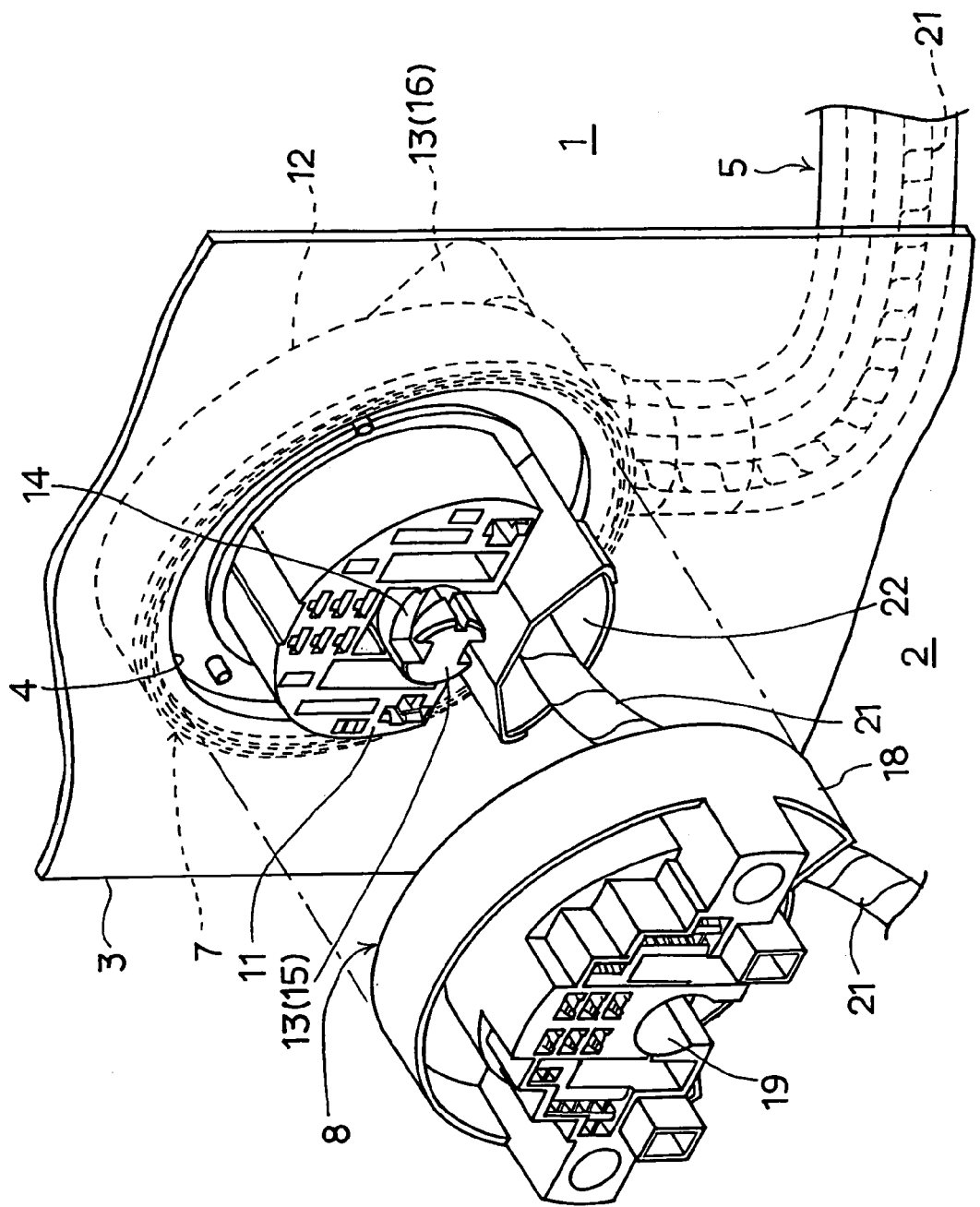
FIG. 2 is a perspective view showing the connector connecting structure shown in FIG. 1.
Figure 3:
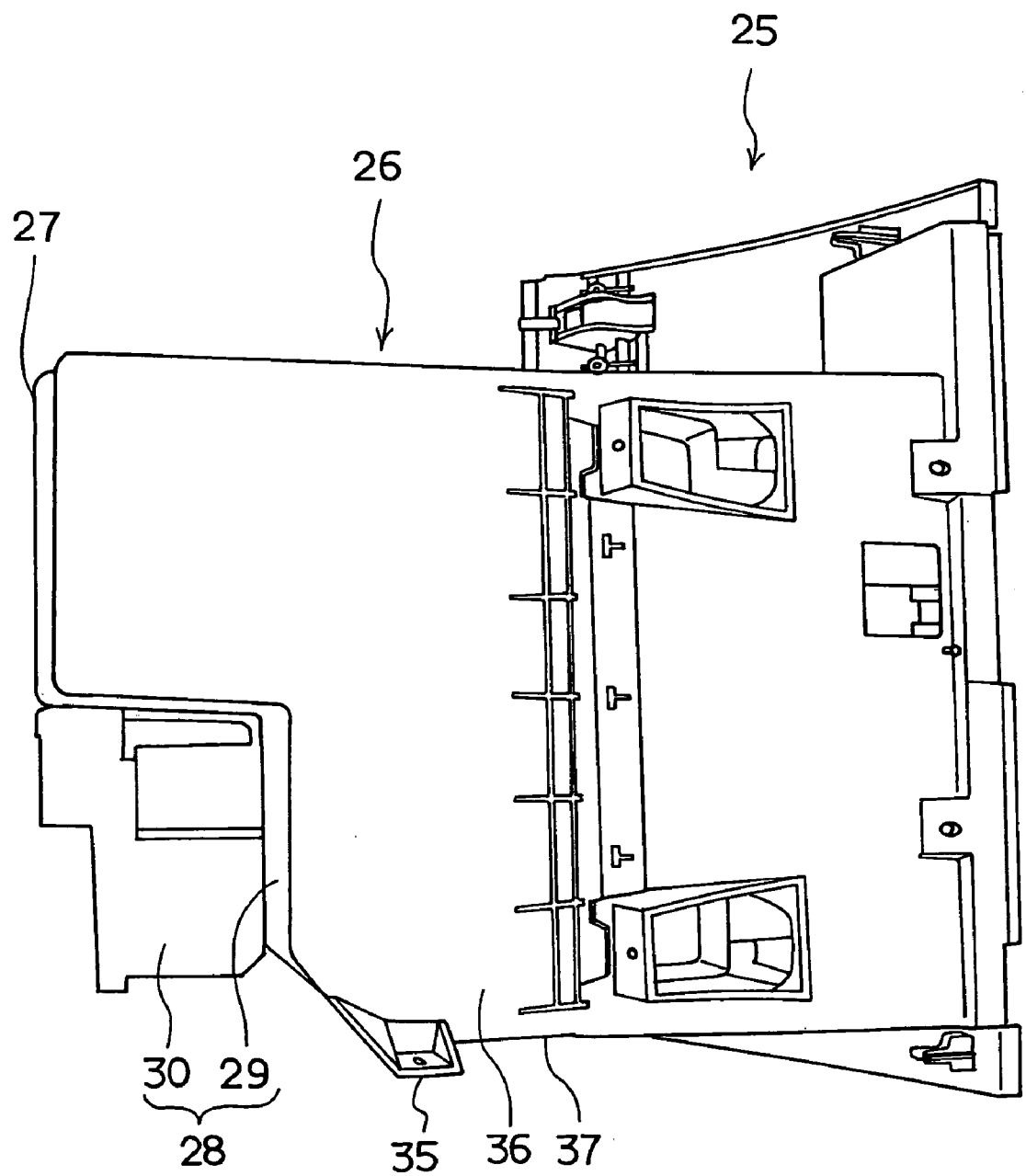
FIG. 3 is a top view showing the structure for the glove box as shown in FIG. 1.
Figure 4:
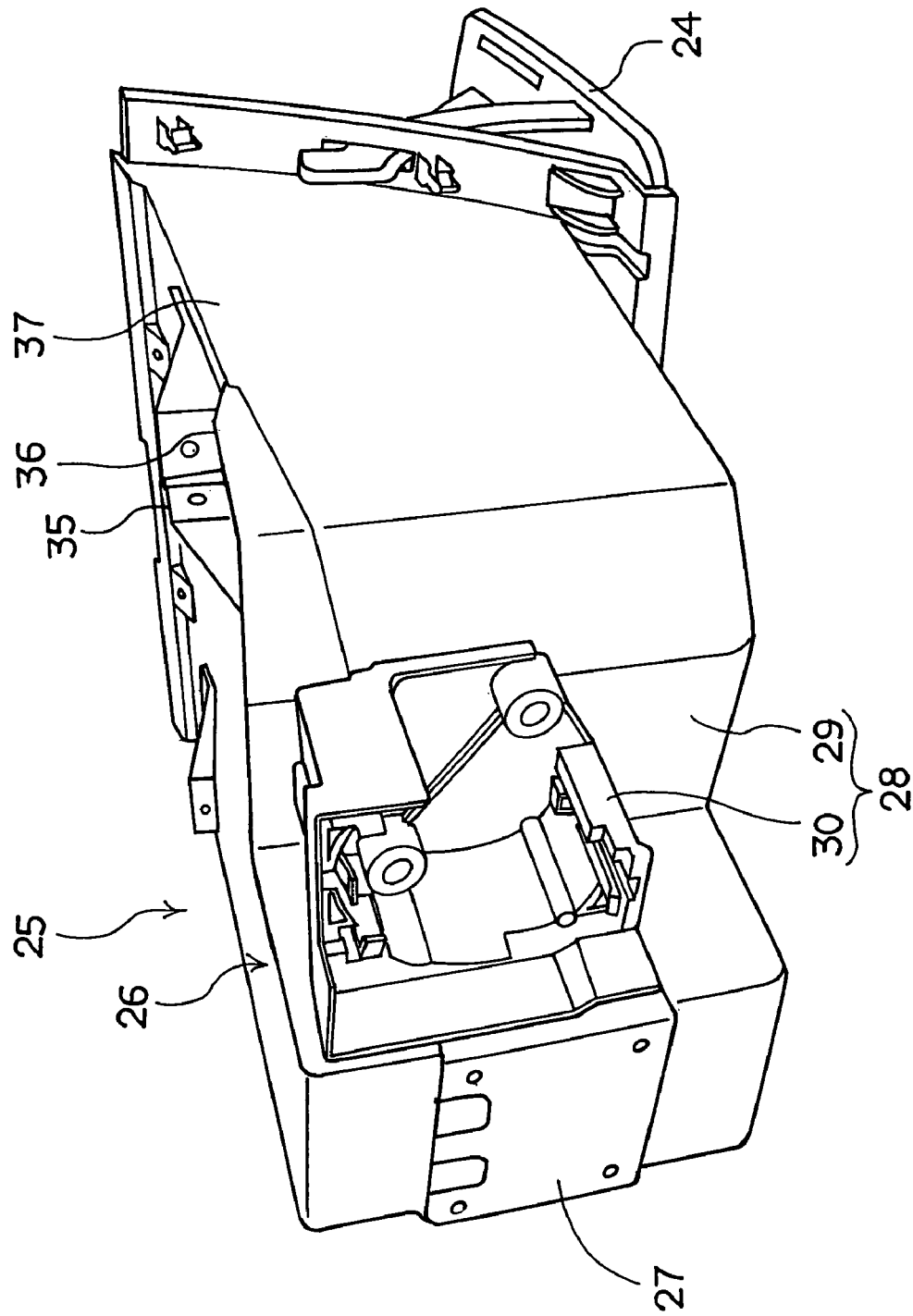
FIG. 4 is a perspective view of the structure for the glove box as shown in FIG. 1 as viewed from a backward thereof
Figure 5:
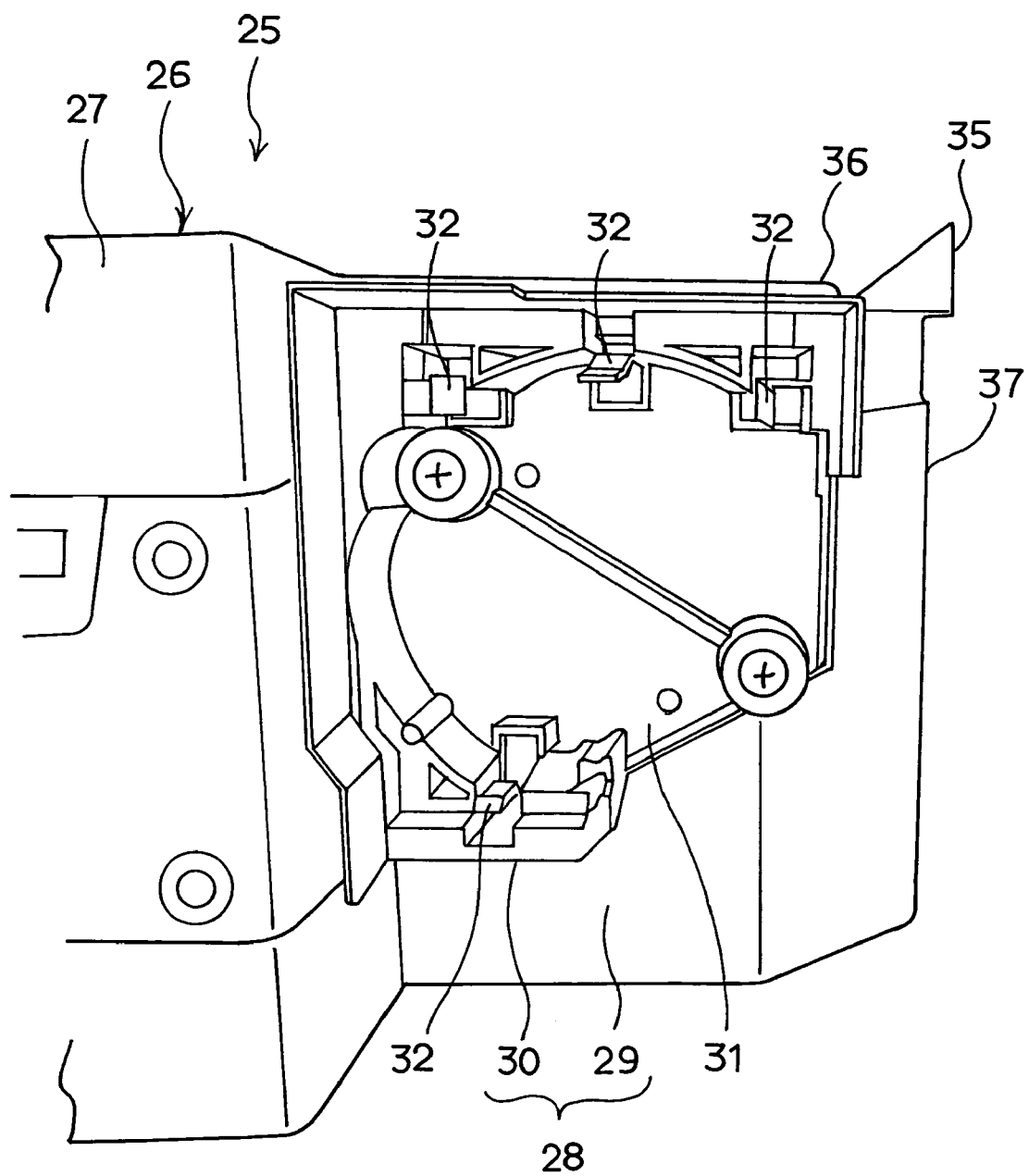
FIG. 5 is a perspective view showing a temporary connector holding part provided on a glove box body.

Here, the first connector 7 connected with the end of the harness 5 wired in the engine room 1 and the second connector 8 connected with the end of the harness 6 wired in the vehicle interior 2 may be formed into any structure, for example, into a structure as shown in FIG. 2. That is to say, the first connector 7 includes a terminal portion 11 disposed to pass through the connector mounting opening 4 provided in the dash-panel 3, a connector cover portion 12 holding the terminal portion 11 and disposed to abut with a peripheral portion of the connector mounting opening 4, and a drawing mechanism 13. The drawing mechanism 13 includes a rotating shaft 15 having a spiral groove 14 and a lever 16 for rotating the rotating shaft 15. The second connector 8 includes a terminal portion 18 which is fitted in the terminal portion 11 and disposed to abut with the peripheral portion of the connector mounting opening 4, and a receiving hole 19 in which the rotating shaft 15 of the drawing mechanism 13 is inserted. A pin (not shown) fitted in the spiral groove 14 and guided thereby is provided to project in the receiving hole 19. A through-passage 22 passing through the other cable 21 and so on is provided between the first and second connectors 7 and 8.

In the embodiment, a rear wall 27 of a glove box body 26 in a glove box 25 attached in the vehicle interior 2 is configured to extend near the dash-panel 3, as shown in FIGS. 1, 3 to 5. An opposite portion of the rear wall 27 opposing to the connector mounting opening 4 provided in the dash-panel 3 is formed into a temporary connector holding part 28. Meanwhile, the glove box body 26 has a box-like shape, the glove box 25 has a lower-hinged lid 24 for opening and closing an opening, which is formed beside an occupant on the glove box body 26.

The above-mentioned temporary connector holding part 28 includes a counter sunk portion 29 formed in the opposite portion of the rear wall 27 opposing to the connector mounting opening 4 and a temporary connector holding bracket 30 attached in the counter sunk portion 29. The temporary connector holding bracket 30 has a connector containing concave portion 31 for containing the second connector 8 and a connector-engaging portion, for example, connector engaging pawls 32.

Further, a harness clamping part 35 is provided near the temporary connector holding part 28 of the glove box body 26. The harness clamping part 35 is provided on a corner between an upper wall 36 and a side wall 37 in the glove box body 26.

Recently, there is carried out a module processing for forming efficiently a cockpit by preparing a cockpit module in which parts around the cockpit are pre-assembled and integrated and mounting the cockpit module on the front portion of the vehicle interior in a vehicle body at once and fixing it, as described above.

The cockpit module includes, mainly a steering member as a strength member for approximately extending in a direction of vehicle's width and connecting right and left vehicle frames, a steering column, a meter device, an air-conditioning unit, air-conditioning ducts, electronic parts or the like such as a car audio and a car navigation system, an airbag module, interior parts such as a glove box, an ash tray, a cup holder or the like, interior members such as an instrument panel a cluster member or the like.

The glove box 25 in the embodiment may be mounted on the cockpit module and assembled on the vehicle body with a single piece.

Next, an operation of the structure of the glove box in the embodiment will be explained.

Previously, a portion of the harness 6 near the second connector 8 is held on the harness clamping part 35 provided on the glove box 25 and the second connector 8 connected with the end of the harness 6 in the vehicle interior 2 is temporarily held on the temporary connector holding part 28. In this state, the glove box 25 is mounted on the vehicle body. Meanwhile, the glove box 25 may be mounted on the cockpit module, or on the vehicle body with the single piece, as described above.

The second connector 8 temporarily held on the temporary connector holding part 28 is positioned to oppose to the connector mounting opening 4, simultaneously with the mounting of the glove box 25 on the vehicle body.

Next, the connector cover portion 12 for the first connector 7 at the end of the harness 5 in the engine room 1 is abutted with the peripheral portion of the connector mounting opening 4, and the terminal portion 11 of the first connector 7 is passed through the connector mounting opening 4 and is fitted temporarily in the terminal portion 18 of the second connector 8, and then the rotating shaft 15 of the drawing mechanism 13 is inserted in the receiving hole 19 of the second connector 8. Thereafter, the rotating shaft 15 is rotated by operation of the lever 16 of the drawing mechanism 13 provided on the first connector 7 to allow the pin to guide in the spiral groove 14 and to draw the second connector 8. As a result, the temporarily held state of the second connector 8 by the temporary connector holding part 28 is released and the second connector 8 is duly fitted in the first connector 7 so that the both harnesses 5 and 6 are in the electrically conducted state.

According to the embodiment, by extending the rear wall 27 of the glove box body 26 near the dash-panel 3 and forming the temporary connector holding part 28 on the opposite portion of the rear wall 27 opposing to the connector mounting opening 4 provided on the dash-panel 3, it is possible to position the second connector 8 to face the connector mounting opening 4 in the dash-panel 3 only by setting the glove box body 26. Moreover, because the glove box body 26 is formed in the box-like shape, hence has a high rigidity, the second connector 8 can be temporarily held surely and efficiently.

As the temporary connector holding part 28, by providing the temporary connector holding bracket 30 on the counter sunk portion 29 formed in the opposite portion of the rear wall 27, the temporary connector holding bracket 30 can be mounted directly and efficiently on the glove box body 26, and the second connector 8 can be temporarily held inexpensively.

Furthermore, by providing the harness clamping part 35 in the vicinity of the temporary connector holding part 28 of the glove box body 26, it is possible to secure efficiently the position of the harness in the vicinity of the second connector 8, and to temporarily hold the second connector 8 in the vicinity of the temporary connector holding part 28, stably. In addition, because the glove box body 26 has the box-like shape, hence has a high rigidity, it is possible to secure easily a rigidity of the glove box body to support the harness 6.

Although the preferred embodiments of the present invention have been described, the present invention is not limited to the embodiments, various changes and modifications can be made for the embodiments.

What is claimed is:

1. A structure of a glove box, wherein a first connector connected with an end of a harness wired in an engine room and a second connector connected with an end of a harness wired in a vehicle interior are temporarily held through a connector mounting opening provided in a dash-panel separating the engine room and the vehicle interior, the structure comprising:
- a glove box body having a rear wall extending near the dash-panel; and
- a temporary connector holding part provided on a portion of the rear wall opposed to the connector mounting opening,
- wherein the temporary connector holding part includes a temporary connector holding bracket attached to the rear wall for temporarily holding the second connector,
- wherein the temporary connector holding bracket has a connector engaging portion that engages with the second connector, and
- wherein the connector engaging portion comprises a connector engaging pawl.

2. The structure of a glove box according to claim 1, further comprising a harness clamping part provided near the temporary connector holding part of the glove box body.

3. A structure of a glove box, wherein a first connector connected with an end of a harness wired in an engine room and a second connector connected with an end of a harness wired in a vehicle interior are temporarily held through a connector mounting opening provided in a dash-panel separating the engine room and the vehicle interior, the structure comprising:
- a box-shaped glove box body having a rear wall extending near the dash-panel; and
- a temporary connector holding part provided on a portion of the rear wall opposed to the connector mounting opening,
- wherein the temporary connector holding part includes a counter sunk portion provided in the rear wall and a temporary connector holding bracket attached to the counter sunk portion of the rear wall for temporarily holding the second connector, and
- wherein the temporary connector holding bracket has a connector containing concave portion that contains the second connector.

4. A structure of a glove box, wherein a first connector connected with an end of a harness wired in an engine room and a second connector connected with an end of a harness wired in a vehicle interior are temporarily held through a connector mounting opening provided in a dash-panel separating the engine room and the vehicle interior, the structure comprising:
- a box-shaped glove box body having a rear wall extending near the dash-panel; and
- a temporary connector holding part provided on a portion of the rear wall opposed to the connector mounting opening,
- wherein the temporary connector holding part includes a counter sunk portion provided in the rear wall and a temporary connector holding bracket attached to the counter sunk portion of the rear wall for temporarily holding the second connector, and
- wherein the temporary connector holding bracket has a connector engaging portion that engages with the second connector.

* * * * *

UNITED STATES PATENT AND TRADEMARK OFFICE
CERTIFICATE OF CORRECTION

PATENT NO.         : 7,114,969 B2                             Page 1 of 1
APPLICATION NO.    : 11/078363
DATED              : October 3, 2006
INVENTOR(S)        : Tomiharu Yamada and Toshiaki Sugisaki It is certified that error appears in the above-identified patent and that said Letters Patent is hereby corrected as shown below:

On Title Page, Item (30), should read,

Foreign Application Priority Data:

March 25, 2004         (JP)         2004-088215

Signed and Sealed this

Seventeenth Day of April, 2007

JON W. DUDAS
*Director of the United States Patent and Trademark Office*